United States Patent
Dunkeld et al.

(10) Patent No.: US 8,001,052 B2
(45) Date of Patent: Aug. 16, 2011

(54) SYSTEM AND METHOD FOR UNIQUE DIGITAL ASSET IDENTIFICATION AND TRANSACTION MANAGEMENT

(76) Inventors: Bryan C. Dunkeld, Sausalito, CA (US); Edward M. Lambert, Mercer Island, WA (US)

( * ) Notice: Subject to any disclaimer, the term of this patent is extended or adjusted under 35 U.S.C. 154(b) by 2155 days.

(21) Appl. No.: 10/016,325

(22) Filed: Dec. 10, 2001

(65) Prior Publication Data
US 2003/0110126 A1    Jun. 12, 2003

(51) Int. Cl.
*G06F 21/00* (2006.01)
(52) U.S. Cl. .......................................... 705/51; 707/607
(58) Field of Classification Search .................... 705/14, 705/51; 707/10
See application file for complete search history.

(56) References Cited

U.S. PATENT DOCUMENTS

| | | | |
|---|---|---|---|
| 5,444,779 A | 8/1995 | Daniele | |
| 5,568,550 A | 10/1996 | Ur | |
| 5,649,013 A | 7/1997 | Stuckey et al. | |
| 5,699,427 A | 12/1997 | Chow et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,943,422 A | 8/1999 | Van Wie et al. | |
| 5,949,876 A | 9/1999 | Ginter et al. | |
| 5,982,891 A | 11/1999 | Ginter et al. | |
| 6,006,332 A | 12/1999 | Rabne et al. | |
| 6,058,106 A * | 5/2000 | Cudak et al. | 370/313 |
| 6,088,337 A * | 7/2000 | Eastmond et al. | 370/280 |
| 6,115,818 A | 9/2000 | Barton | |
| 6,182,218 B1 | 1/2001 | Saito | |

(Continued)

FOREIGN PATENT DOCUMENTS
WO    0111623    2/2001
(Continued)

OTHER PUBLICATIONS

Bartolini, F. et al., "Electronic Copyright Management Systems: Requirements, Players and Technologies," dexa, 10th International Workshop on Database & Expert Systems Applications, 1999, 3 pages.

(Continued)

*Primary Examiner* — Evens J Augustin
(74) *Attorney, Agent, or Firm* — J. Nicholas Gross

(57) ABSTRACT

The present invention provides a method for tracking of digital assets within a system through the use of digital serial numbers. Systems equipped with the present invention can uniquely identify copies of assets within it. Assets that originate within the system can be uniquely identified even outside the system. Their transaction history within the system can be traced by looking up the transaction history associated with an assets' serial number. The serial number applied to an asset is unique to each transaction and applied at the time a copy is made. Database entries are created that link each unique serial number to aspects of the transaction. Each serial number references details about a particular transaction such as parties involved, date and time of copy, ownership, terms of use, and payment terms. Using the present invention any copy of an asset within the system can be copied to another part of the system as if it were the original and with the accompanying terms and conditions in effect for that original at the time of transfer. The serial number does not noticeably interfere with the intended usage of the asset. Serial numbers can be applied to any asset media type or format.

42 Claims, 3 Drawing Sheets

U.S. PATENT DOCUMENTS

| | | | |
|---|---|---|---|
| 6,226,618 B1 | 5/2001 | Downs et al. | |
| 6,233,684 B1 | 5/2001 | Stefik et al. | |
| 6,237,786 B1 | 5/2001 | Ginter et al. | |
| 6,240,185 B1 | 5/2001 | Van Wie et al. | |
| 6,247,130 B1 | 6/2001 | Fritsch | |
| 6,247,133 B1 | 6/2001 | Palage et al. | |
| 6,253,193 B1 | 6/2001 | Ginter et al. | |
| 6,266,430 B1 | 7/2001 | Rhoads | |
| 6,266,654 B1 | 7/2001 | Schull | |
| 6,282,573 B1* | 8/2001 | Darago et al. | 709/229 |
| 6,289,108 B1 | 9/2001 | Rhoads | |
| 6,289,450 B1 | 9/2001 | Pensak et al. | |
| 6,389,538 B1 | 5/2002 | Gruse et al. | |
| 6,415,280 B1* | 7/2002 | Farber et al. | 707/2 |
| 6,636,854 B2* | 10/2003 | Dutta et al. | 707/10 |
| 6,697,944 B1* | 2/2004 | Jones et al. | 713/168 |
| 6,738,744 B2* | 5/2004 | Kirovski et al. | 704/273 |
| 6,829,368 B2* | 12/2004 | Meyer et al. | 382/100 |
| 7,062,622 B2* | 6/2006 | Peinado | 711/163 |
| 7,068,809 B2 | 6/2006 | Stach | |
| 7,069,449 B2* | 6/2006 | Weaver et al. | 713/193 |
| 2001/0004736 A1 | 6/2001 | Hirano et al. | |
| 2001/0005423 A1 | 6/2001 | Rhoads | |
| 2001/0008557 A1 | 7/2001 | Stefik et al. | |
| 2001/0019618 A1 | 9/2001 | Rhoads | |
| 2001/0021926 A1 | 9/2001 | Schneck et al. | |
| 2001/0025341 A1 | 9/2001 | Marshall | |
| 2001/0031066 A1* | 10/2001 | Meyer et al. | 382/100 |
| 2001/0034771 A1* | 10/2001 | Hutsch et al. | 709/217 |
| 2001/0038610 A1 | 11/2001 | Decker et al. | |
| 2001/0039497 A1 | 11/2001 | Hubbard | |
| 2001/0041989 A1 | 11/2001 | Vilcauskas, Jr. et al. | |
| 2001/0042043 A1* | 11/2001 | Shear et al. | 705/51 |
| 2001/0051996 A1* | 12/2001 | Cooper et al. | 709/217 |
| 2002/0002541 A1* | 1/2002 | Williams | 705/51 |
| 2002/0007456 A1* | 1/2002 | Peinado et al. | 713/164 |
| 2002/0033844 A1* | 3/2002 | Levy et al. | 345/744 |
| 2002/0049760 A1* | 4/2002 | Scott et al. | 707/10 |
| 2002/0052885 A1* | 5/2002 | Levy | 707/200 |
| 2002/0069117 A1* | 6/2002 | Carothers et al. | 705/26 |
| 2002/0073204 A1* | 6/2002 | Dutta et al. | 709/227 |
| 2002/0080964 A1* | 6/2002 | Stone et al. | 380/255 |
| 2002/0107691 A1* | 8/2002 | Kirovski et al. | 704/270 |
| 2002/0111912 A1* | 8/2002 | Hunter et al. | 705/52 |
| 2002/0156743 A1* | 10/2002 | DeTreville | 705/57 |
| 2002/0168082 A1* | 11/2002 | Razdan | 382/100 |
| 2003/0097299 A1* | 5/2003 | O'Kane et al. | 705/14 |
| 2004/0078293 A1* | 4/2004 | Iverson et al. | 705/27 |
| 2005/0273599 A1 | 12/2005 | Khandelwal et al. | |
| 2008/0172747 A1 | 7/2008 | Hurtado et al. | |

FOREIGN PATENT DOCUMENTS

| | | |
|---|---|---|
| WO | WO 01/38993 A2 | 5/2001 |
| WO | WO 01/44973 A2 | 6/2001 |
| WO | 0175794 | 10/2001 |
| WO | WO 01/78303 A2 | 10/2001 |

OTHER PUBLICATIONS

Derfler, Frank and Les Freed; "How Networks Work," Millennium Edition. Que Publishing, 2000 ISBN 0-7897-2445-6. Front and back matter, chapters 1-27, 228 pages.

White, Ron; "How Computers Work," Millennium Edition. Que Publishing, Indianapolis, 1999. ISBN 0-7897-2112-0. Chapters 1-9, 14-31, 284 pages.

Bloom, Jeffrey et al.; "Copy Protection for DVD Video," (1999), 10 pages.

* cited by examiner

SYSTEM AND METHOD FOR UNIQUE DIGITAL ASSET IDENTIFICATION AND TRANSACTION MANAGEMENT

FIELD OF THE INVENTION

The present invention relates to the tracking of digital assets over a network, and more particularly to marking of a digital asset to link a unique asset serial number to transaction, license, and rights management information.

BACKGROUND OF THE INVENTION

Historically distribution of intellectual property works has been controlled through the production of quality reproductions on a medium that can be sold to interested parties. With the advent of the Internet and its subsequent distribution capability and broad acceptance, intellectual property assets that can be digitized can now be reproduced and distributed without quality degradation or compensation to the rights holders. New systems for controlling the distribution, royalty payment, and terms of use for these assets are being created to better take advantage of and mitigate the disadvantages of this new medium.

As a first step many rights holders have begun to add digital watermarks to their assets. Assets are then distributed in a variety of ways to customers who have paid for them. When an asset is encountered in questionable circumstances, the watermark is identified and the user is asked to produce proof of purchase for that asset or face consequences. These watermarks are applied at the time the digital asset is created and used for identification and enforcement purposes. Unfortunately, the use of watermarks alone is not sufficient to ensure that transfers of digital assets are properly accounted for.

Another approach has been to encrypt assets before distribution. Before the asset can be used, the purchaser must acquire a key to unlock the asset. This places a great demand on customers and runs the risk of increasing frustration levels. This also requires secure key management thus shifting the problems to another asset that must be managed. Encrypted assets have been popular among rights holders but to date have not been widely accepted by customers.

Some rights holders are establishing new media formats that contain mechanisms to control usage. Such distribution methods can control numbers of playbacks and still be portable for use on properly equipped machines. For the consumer this means adopting new (and potentially incompatible) media formats, technology, and hardware. This approach requires a high degree of industry adoption and customer base penetration to be successful.

As a method of preventing copies from being pirated, some systems are trying to establish a market for streaming assets. This allows for a controlled one time delivery and use of the asset by the customer. At present customers have not fully adopted this medium for a variety of reasons. In particular, it lacks the convenience of portability and playback and as yet paying for subscriptions has not proved a popular model.

Accordingly, there is clear and compelling need for an improved system for introducing, distributing and tracking digital assets in a manner that balances the needs of rights holders and end users. In addition, it would be extremely desirable to allow peer-to-peer transfer (or controlled centralized distribution) of assets in formats that are already widely adopted and popular while identifying payment and usage restrictions at the time of transfer.

SUMMARY OF THE INVENTION

A primary object of the present invention, therefore, is to provide an improved system and method that overcomes the aforementioned disadvantages of the prior art;

A further object of the present invention is to provide a system and method for permitting rights holders to introduce digital assets into a controlled distribution/tracking network under suitable terms of use and other customized, flexible distribution conditions;

A further object of the present invention is to provide end-users and other consumers of digital content with an easy, flexible and relatively transparent environment for locating, securing and enjoying digital assets of interest;

A related object of the present invention is to ensure that such digital assets are substantially backwards compatible with the large existing infrastructure of installed hardware devices/software that play an assortment of digital content, such as MP3 players, MPEG 2 players, etc., so that users do not have to make additional investments in proprietary hardware and software;

Another object of the present invention is to provide a digital asset management system and method that tracks transfers of digital assets within a network, so that terms of use compliance issues, accounting issues, etc., are transparently and accurately recorded;

A related object is to provide a tracking mechanism and method that relies primarily on creating separate instantiations of a digital asset to facilitate tracking of the latter;

Still a further related object is to provide a tracking and accounting system and method that is reasonably robust and trustworthy so as to overcome rights holders doubts and uncertainties concerning the use and distribution of their products;

Another related object is to reduce the need for cumbersome encryption/licensing procedures which inhibit user interaction and thus the potential market for distribution and enjoyment of digital assets;

Yet another object of the present invention is to ensure that a tracking system and method is sufficiently flexible to accommodate a variety of different digital content media, and a variety of different computing platforms used by end users;

A related object of the present invention is to provide users with a peer to peer environment for exchanging digital assets, to ensure that a distribution system is compatible with existing practice, tastes and preferences;

It will be understood from the Detailed Description that a number of different unique inventions are presented by the present disclosure, each of which can be implemented in a multitude of different embodiments. Furthermore, it will be readily appreciated by skilled artisans that such different embodiments will likely include only one or more of the aforementioned objects of the present inventions. Thus, the absence of one or more of such characteristics in any particular embodiment should not be construed as limiting the scope of the present inventions.

In accordance with one aspect of the present invention, a digital asset is marked with a unique serial number using steganographic techniques at the time the asset is introduced into a system. The digital asset is also marked with a new unique serial number each time it is transacted within the system.

In accordance with another aspect of the present invention the serial number is recorded in databases where it is linked to specifics about the time and parties involved in the transaction as well as additional information such as details of ownership, royalties, and terms of use associated with the digital asset.

Another aspect of the present inventions concerns a system for distributing digital assets in a peer-to-peer connectable environment across a network, including between a first peer network device and a second peer network device connected to the Internet. The system includes a first rights-holder server coupled to the network and adapted to introduce a digital asset into the peer-to-peer connectable environment. The digital asset audio, video, picture and/or text based data associated with a first set of distribution rules, which in a preferred embodiment, are not static, and can change from transfer to transfer. A second host server is coupled to the network, and such server stores and distributes the digital asset to end users. A third management server is also coupled to the network, and it is adapted to track transfers of the particular digital asset over the network and to generate tracking records associated with such transfers. With this architecture, transfers over the network involving the digital asset, including between the first peer network device, the second peer network device and/or the second host server are all processed in accordance with the desired first set of distribution rules set out by the rights holder.

This architecture ensures security, compliance, and accountability for each instantiation of the asset. Furthermore, it enhances user ease of use since the customer peer network device can obtain the digital asset from the second peer network device and/or the second host server, and without requiring further authorization from the first rights-holder server. Thus, transfers of the digital asset are also performed in a peer to peer fashion over the network.

In a preferred embodiment the digital asset is modified for each transfer, and this modification is used by the third management server for generating the tracking records. Again, the modification does not alter user-perceptible content of the digital asset. Further in a preferred embodiment, the modification constitutes an original or altered identification label (serial number) for the digital asset so that each transfer of the digital asset is associated with a unique identification label. Furthermore, to assist the tracking of the digital asset, a separate and new instantiation of the digital asset is created for each transfer occurring over the network between peer devices.

The first set of distribution rules include indexing information, terms of use, and a location of the second host server to facilitate transfers. The digital asset can also be encrypted to reduce unauthorized transfers over the network in a manner similar to that used in prior art systems.

Another aspect of the present inventions is directed to a rights holder system for introducing digital assets into an electronic network distribution system. The system includes a first computer coupled to the electronic network distribution system, which again, includes the Internet. A client/server software module includes software routines to perform at least the following operations: (1) receiving and storing a digital asset on the first computer; (2) processing administration information for the digital asset, including an asset identifier and a rights-holder identifier, and associating the same with the digital asset; and (3) interacting with a digital asset management system to generate a modified version of the digital asset. The modified version of the digital asset is based on the administration information and tracking history information provided by the digital asset management system. Thereafter the modified version of the digital asset is posted to any one or more locations suitable for download by the peer devices from the electronic network distribution system. Accordingly, the modified version of the digital asset is configured so that a tracking history can be maintained by the digital asset management system of each transfer of separate instantiations of the digital asset between peer devices coupled to the electronic network distribution. This formatting of the digital asset, therefore, allows it to be securely but easily transacted at later time, and with a varying set of distribution rules.

The administration information includes, among other things, terms of use and expiration data for the digital asset. Furthermore, the administration information can include a set of distribution rules that can be changed so that later instantiations/transactions of the digital asset within the electronic network distribution system can be controlled on a transaction by transaction basis.

The rights holder system is further configured to receive accounting information from the digital asset management system, including: (a) information concerning the number of instantiations of the digital asset created by transfers within the electronic network distribution system; (b) revenue derived from and/or to be credited for the transfers.

A further aspect of the present invention is directed to an improved system for exchanging digital assets over a network in a peer to peer fashion including a first computer coupled to the network, the first computer storing a digital asset which includes both digital content and a first unique identifier associated with a first instantiation of the digital asset; and a second computer coupled to the network. A first software routine executing on the first computer and/or the second computer is adapted to coordinate transfer of the digital asset to the second computer. By creating a second instantiation of the digital asset for the transfer to the second computer, including a second unique identifier, peer-to-peer transfers can be accommodated and yet still accounted for properly.

If either of the two client devices thereafter elects to host the digital asset, a second transfer of the digital asset can occur from either the first computer and/or the second computer, the second transfer further using a third instantiation of the digital asset and a third unique identifier. In a preferred embodiment, the client computer devices can include a portable electronics device, a personal computer, a personal digital assistant, and/or a telephone, and the digital content of the digital asset includes an MP3 based audio file.

In another variation, the second unique identifier is based on combining information from any one or more of the following: a first id for the first computer, a second id for the second computer, an asset id for the digital asset, a customer id, a randomly generated number and/or a time of the transfer.

To increase the utility of the system, a catalog of available digital assets is maintained at the first computer; this catalog may be based on a centralized database of items, or may reflect only items available in nearby download locations. Thus, the second computer can poll other computers coupled to the network to determine an optimal transfer source for the digital asset.

Preferably, before any assets are transferred, an authorization routine—adapted to secure agreement from a user of the second computer to access terms associated with the digital asset—is first executed.

Also in a preferred embodiment, a setup routine is executed for the end user. This routine is adapted to set up a transaction account with a digital asset management system separate from the first computer and the second computer. The user's transaction account includes an identifier for a user of the second computer, identifiers for any transfers performed by the user, and billing information associated with the transfers.

In a further variation, the first computer can also elect to perform hosting functions, and thus receive credits from the digital asset management system for all authorized transfers made of digital assets.

Another aspect of the present invention is directed to a system for managing transfers of digital assets over a network. This aspect includes a management computer coupled to the network (Internet) and supported by a variety of software modules and file structures including tracking databases. A first software routine executing on the management computer prepares a digital asset for transfer over the network in accordance with a set of distribution rules (preferably provided by a rights holder). A modified version of the digital asset is generated by the first software routine including a unique identification number associated with a first instantiation of the modified version of the digital asset. A second software routine executing on the management computer tracks transfers of the digital asset over the network, by correlating a separate instantiation of the digital asset created for each transfer occurring over the network.

In this fashion, transfers of the digital asset can take place in a peer-to-peer manner over the network in coordination with the management computer and such that a complete tracking history for the digital asset is maintained by the system. To assist in locating and transferring digital assets, electronic indexes and catalogs are provided by the management computer.

Preferably, the set of distribution rules are provided by a rights-holder management system, and include restrictions on terms of use and time periods of use. The set of distribution rules include information on title, author, and identification numbers for the digital asset.

In a preferred embodiment, the unique identification number is a serial number embedded into the first instantiation of the modified version of the digital asset using a steganographic process. To facilitate tracking of later transfers, a subsequent unique identification number used for a second instantiation of the digital asset. In some applications the subsequent ID can be derived in part from the unique identification number.

Further in a preferred approach, the first software routine uses an index to further identify network accessible locations available for transfers of the digital asset.

In another variation, an accounting routine is used by the digital rights management system for performing accounting functions in connection with the transfers, including crediting of rights holders accounts, crediting of transaction host accounts, and/or debiting of user accounts.

In still another variation, a monitoring routine performs authentication operations on digital assets stored and/or transferred between client systems over the network. The authentication operations include a determination of an embedded serial number of a digital asset and an identification of a last authorized transfer of the digital asset. Depending on the findings of such monitoring routine, adjustments can be made to a user account, including access privileges, to ensure compliance with the terms of use and other distribution rules.

Further in a preferred embodiment of this aspect of the invention, a tracking database keeps a tracking history for the digital assets, including all transfers over the network. This history can be derived from the unique identification (serial) number embedded steganographically within certain portions of the digital asset. To facilitate locating the embedded serial number, an offset can be computed and stored in a header or other portion of the digital content file.

In a preferred implementation, therefore, distributions of the digital asset over the network are not preconditioned on securing authorization for individual copies of the digital asset.

Other aspects of the present invention are directed to novel and improved methods of introducing, transferring, tracking and managing digital assets across a network, including in a peer to peer connectable environment.

These include a method of distributing digital assets in a peer-to-peer connectable environment across a network, including between a first peer network device and a second peer network device, which includes the following steps: (a) introducing a digital asset into the peer-to-peer connectable environment, the digital asset having an associated first set of distribution rules; and (b) storing and distributing the digital asset at a first network accessible location so that a transfer of the digital asset can be made by the first peer network device and/or the second peer network device; and (c) generating a tracking record associated with the transfer; and (d) repeating at least step (c) for any subsequent transfers of the digital asset within the network.

In accordance with this improved transfer methodology the initial transfer, as well as any of the subsequent transfers over the network involving the digital asset between the first peer network device, the second peer network device and/or the first network accessible location are processed in accordance with the first set of distribution rules and are associated with tracking records.

In addition another aspect of the invention concerning a method of introducing digital assets into an electronic network distribution system includes the following steps: (a) receiving and storing a digital asset on a first computer coupled to the electronic network distribution system; and (b) processing administration information for the digital asset, including an asset identifier and a rights-holder identifier; (c) associating the administration information with the digital asset; and (d) interacting with a digital asset management system to generate a modified version of the digital asset, the modified version of the digital asset being based on the administration information and tracking history information provided by the digital asset management system; (e) posting the modified version of the digital asset to a location suitable for download by client devices from the electronic network distribution system.

In this fashion, the digital asset is configured in a manner such that a tracking history can be maintained by the digital asset management system of each transfer of separate instantiations of the digital asset between peer devices coupled to the electronic network distribution.

Another aspect of the present invention concerns a method of exchanging digital assets over a network and includes the steps of: (a) storing a digital asset on a first computer coupled to the network, which digital asset includes both digital content and a first unique identifier associated with a first instantiation of the digital asset; and (b) coupling the first computer to a second computer over the network; and (c) creating a second instantiation of the digital asset, including a second unique identifier; (d) storing the second instantiation of the digital asset at the second computer.

Still a further aspect of the present invention is directed to a method of managing transfers of digital assets over a network, and includes the steps of: (a) coupling a digital asset management computer to the network; and (b) providing a digital asset to the digital asset management computer; and (c) providing a set of distribution rules for the digital asset; and (d) preparing a modified version of the digital asset for transfer over the network in accordance with the set of distribution rules, the modified version including a unique identification number associated with a first instantiation of the modified version of the digital asset; and (e) tracking transfers of the digital asset over the network. With this inventive process, a separate instantiation of the digital asset is created for each transfer occurring over the network, thus facilitating accurate tracking, accounting and security for such asset.

Yet another object of the present invention is directed a more detailed method of providing a digital asset for distribution including the steps of: (a) preparing a digital asset for distribution over an electronic network, the digital asset including digital content that is associated with a digital rights holder; (b) providing a serial number for the digital asset, the serial number being uniquely identified with a first introduction of digital asset for distribution within the electronic network; and (c) embedding the serial number within the digital asset so as to generate a first instantiation of the digital asset suitable for distribution over the electronic network; and (d) placing the first instantiation of the digital asset in one or more locations accessible by users of the electronic network; and (e) providing a list of the one or more locations so that the users of the electronic network can locate the first instantiation of the digital asset; (f) updating a transaction database associated with the digital asset to reflect an occurrence of the first instantiation of the digital asset; (g) updating a digital asset index database with administrative information associated with the digital asset, including a list of the one or more locations, terms of use of the digital asset and category information for the digital asset. Using this inventive method, users of the electronic network can monitor the digital asset index database before electing to access the first instantiation and/or later instantiations of the digital asset.

Another object of the present invention includes a method of distributing a digital asset within an electronic network that includes the steps of: (a) providing an index of digital assets available for distribution over the electronic network, each digital asset having a first serial number associated with a first transfer within the network, and including digital content that is associated with a digital rights holder. The index thus includes a list of one or more locations for the digital assets, terms of use of the digital assets and category information for the digital assets. Additional steps performed also include: (b) providing a second serial number for the digital asset in response to a request for a second transfer of a digital asset, the second serial number being embedded within the digital asset; and (c) transferring the digital asset from a host server to a client device in response to a confirmation of acceptance of the terms of use for the digital asset; and (d) updating a transaction database associated with the digital asset to reflect the second transfer of the digital asset.

Accordingly several objects and advantages of the invention include:

Peer-to-peer structure preserved. Assets may be transferred in a peer-to-peer environment. This allows greater transfer performance by decentralizing distribution and allowing any copy of an asset to become a source for additional copies. This advantage leads to lower operational overhead, greater transfer speed, and more robust transfers. Peer-to-peer transaction structures are proving very popular with users. Rights holders are not enamored with such distribution schemes, however, as assets are being acquired without transaction history or rights compensation. The present invention remedies these shortcomings by creating transaction records and accountability while preserving the ease of use of a peer-to-peer transaction structure. Additionally the structure of tracking transactions allows the incentivization of hosts in the system by compensating them for hosting transfers, a short coming in the present peer-to-peer structures where only a small percentage of network participants elect to host asset transfers.

Media agnostic. Since digital media formats are receptive to steganographic techniques without noticeable quality degradation, assets may be distributed in popular media formats. This removes any requirements for specialized software or hardware for media playback and allows media to be used in already popular devices and methods and allows portability to playback systems outside the network. Additionally the present invention may be overlaid on existing ownership identification and rights management schemes already present in existing and future media formats.

Flexible transaction terms. Present and proposed file exchange systems that provide for compensation terms treat the initial distribution of an asset as the one for which compensation may be obtained and that compensation is static. The present invention treats each instantiation of an asset as unique and as such the terms of acquisition can be flexible with respect to time, parties involved in the transaction, prior purchasing, intended usage, etc. Further more any asset can be linked to the specific terms under which it was transferred at any time by referencing the serial number to the transaction record.

Rights Protection. Since each asset is marked at the time of transfer, ownership is asserted, royalties due can be calculated, and terms of use can be articulated. These terms can change with each transaction or conditions surrounding the transaction as necessary. Since assets can be identified by their mark, other naming schemes can be used for indexing or other purposes without affecting or obscuring ownership, royalties, terms of use, or any other parameter that may be associated with the asset or the transaction. Assets both in and out of the system can be identified through their mark. Furthermore a full transaction history can be constructed by linking the most recent mark back through the centrally recorded transaction history. This can be useful for tracking deviant use or distribution of assets.

From the discussion below it will be apparent that the present invention can be used in complementary fashion alongside any of the aforementioned prior art approaches and technologies. Indeed one of the primary objectives of the present invention is to work with popular existing media formats and media exchange paradigms. Thus, another advantage of the present scheme is that preexisting installations and/or implementers can easily overlay the techniques discussed herein to supplement the functionality of such systems.

DETAILED DESCRIPTION OF THE PREFERRED EMBODIMENT

Overview

Figure 1:
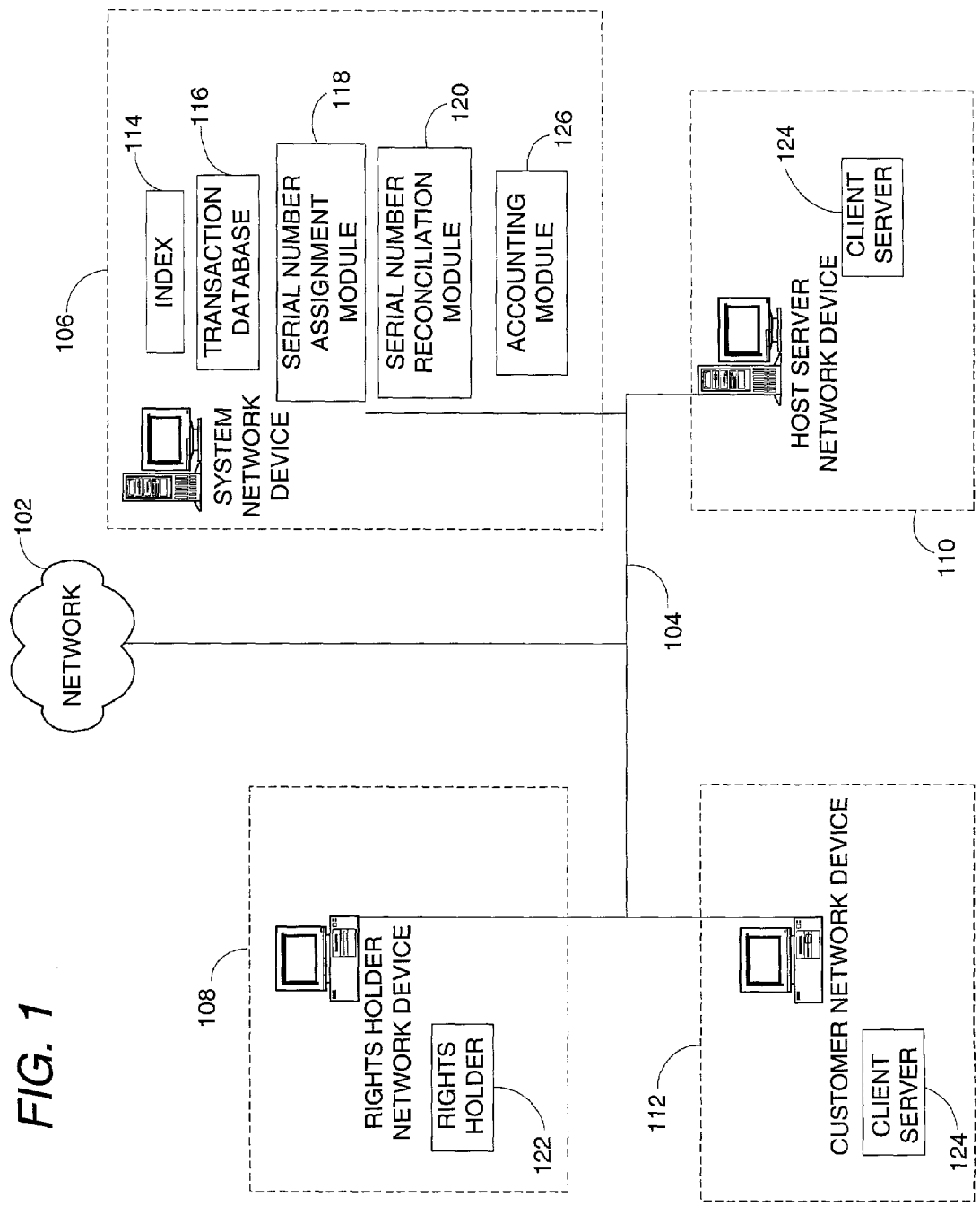
FIG. 1 is a block diagram illustrating the basic components of a digital asset distribution/tracking system configured in accordance with a preferred embodiment of the present invention.

The present invention relates to methods and a system for monitoring the transfer of digital assets within a network. A preferred embodiment embeds a unique serial number in each instantiation of an MP3 File at the time of transfer within a peer-to-peer internet based MP3 file distribution system. This provides a number of advantages explained further below.

Historically the concept of an "original" and a "copy" had teal meaning. Quality typically degraded as assets were copied outside of the manufacture's control. Monetization of originals was the only certain revenue stream to the asset Rights Holder. Technological advances have since allowed duplication of originals without quality degradation or discernable differences from those released by the manufacturer. Consequently the present inventions use a mechanism for linking assets to Rights Holders and monetizing every instantiation of that asset. The concept of "original" and "copy" are dispensed with. Transactions and asset paths are tracked to provide convenient distribution while at the same time assuring proper compensation for Rights Holders and authorized distributors.

Recently peer-to-peer distribution systems have proved very popular, particularly for audio files formatted according to the MP3 standard. They require low overhead by the maintainer and increase access speeds and decrease download times because of the number of choices of locations from which an asset may be downloaded. The main drawback has been monetizing the transactions and paying royalties to the rights holders of the digital assets being traded. This is in large part because there is no mechanism currently to track the assets as they are transferred.

More traditional distribution schemes control the distribution of assets through centralized control. This requires more capital investment by the provider and does nothing to ensure proper rights management once the customer has the asset (i.e., later downstream transactions to another user). Asset origins cannot be traced once the asset has been distributed to the customer. Furthermore, an entirely centralized distribution system does not scale well, and cannot exploit the many benefits of a peer to peer environment. As explained below, a preferred embodiment of the present invention retains the advantages of a peer-to-peer distribution while marking each distributed asset for later identification at the time of transfer, linking the asset to specific usage rights, and providing for royalty compensation to the Rights Holder of the asset.

New peer-to-peer distribution schemes are beginning to emerge that incorporate digital rights management. However these schemes rely on encrypting the assets or the adoption of new proprietary (and backwards incompatible) asset formats by customers in order to provide rights management. A preferred embodiment of the present invention avoids these pitfalls while retaining the advantage of distributing assets in an immediately useful and popular format by using steganographic techniques to mark each asset without impairing its playback quality, or its usability across a variety of preexisting hardware and software computing platforms.

Steganographic techniques have been used in the past in a limited fashion to watermark assets to identify ownership. Typically this is done at the time the asset is formatted for the purpose of ownership enforcement. Steganography has also been used in some applications to hide information within assets. In a preferred embodiment of the present invention steganography is used in an entirely unique fashion to track digital assets through intelligent marking. These markings mark an asset in such a way as to not degrade its quality, and provide a means of linking that asset to a transaction record. Furthermore, the mark is embedded in such a way that removing or altering it in a non-detectable way is difficult. This new use of steganography techniques, therefore, allows a rights management system to be employed with existing formats and transaction methods.

One key purpose of the present inventions is to allow individual customers to trade digital assets with each other while compensating rights holders for their work. The described system allows each asset to be identified and tracked (preferably) at the time the asset is transferred. While the described preferred embodiment describes a system for trading MP3 files in a peer-to-peer environment many other configurations of assets and networks are possible.

Structure of the Preferred Embodiment

A preferred embodiment of a digital asset distribution/tracking system 100 constructed in accordance with the present inventions is illustrated in FIG. 1. The system is composed of several components including a Network 102, through which a number of separate Network Connections 104 are provided to a System Network Device 106, a Rights Holder Network Device 108, a Host Server Network Device 110, and a Customer Network Device 112. It will be understood by those skilled in the art that other components may be connected to Network 102, and that not all connections shown need to be active at all times. There are also several software components associated with the aforementioned network-connected devices, including an Asset Index 114, a Transaction Database 116, a Serial Number Assignment module 118, a Serial Number Reconciliation Module 120, a Rights Holder Module 122, and Client Server modules 124 and 126.

Network 102 is preferably the Internet, but could be any implemented in any variety of commonly used architectures, including WAN, LAN, etc. Network Connections 104 are conventional dial-up and/or network connections, such as from analog/digital modems, cable modems, etc., between any conventional network device and an Internet Service Provider in combination with browser software such as Netscape Navigator, Microsoft Internet Explorer or AOL. In most applications, Rights Holder Network Device 108 and Customer Network Device 112 will be typically personal computers, while the System Network Device 106 and Host Server Network Device 110 are typically network servers. Of course, other structures and architectures may be more suitable on a case by case basis for any particular implementation of the present inventions, and so the present inventions are not limited in this respect.

Software elements of the present invention typically will be custom tailored for a particular application, but preferably will include some common features, including the following.

Operating on System Network Device 106 ate the following software routines and/or supporting structures, which implement a form of digital asset management. First, an Asset Index 114 contains a list of digital assets available on the network organized and searchable by Title, Artist and other attributes as determined by customer popularity, system administrative requirements, and the like. A Transaction Database 116 contains information about each transaction that takes place within system 100 with a serial number primary key linked to such information as asset, rights holder, time of transfer, length of time of transfer, customer, host of transfer, terms in effect at time of transfer, etc. A Serial Number Assignment Module 118 doles out unique serial numbers in response to a transaction request. A Serial Number Reconciliation Module 120 receives assigned Serial Numbers from Serial Number Assignment Module 118 and reconcile them with completed transaction updates from customers. A Serial Number Reconciliation Module 120 periodically assesses transfer completion performance based on open and closed transactions associated with transaction hosts and the time it took for transactions to complete.

On the Rights Holder Network Device 108, a Rights Holder Client module 122 communicates with Serial Number Assignment Module 118 and Serial Number Reconciliation Module 120 to allow a rights holder to introduce an asset in to the system. As used herein, a rights holder refers to an entity that has at least some ownership interest in some form of content to be disseminated within system 100, and who wishes to be compensated in some fashion for distribution/use of such content in accordance with a set of distribution rules (discussed later). In this regard, Rights Holder Network device 108 may be shared by any number of individuals, corporations, etc., who wish to introduce content to system 100.

On Host Server Network Device 110 a Client Server module 124 allows two parties involved in a transaction to transfer an asset between them over network 102. This device further acts as an initial repository and later accessible download site, if desired, for introductions of digital assets.

System Network Device 106 further includes an Accounting Module 126 to reconcile accounts of the Rights Holder, Host, and Customer after the completion of each transaction. It is expected, for example, that some or all of such entities may share in the compensation charged for each transaction according to some tailorable formula. This module also calculates transaction performance characteristics such as time of transfer, volume of transfers, and percentage completion for the Hoster, Customer, Rights Holder, and the individual digital asset, which information may be periodically updated in Index 114 and Transaction Database 116.

It will be apparent to those skilled in the art that this is not the entire set of software modules that can be used, or an exhaustive list of all operations executed by such modules. It is expected, in fact, that other features will be added by system operators in accordance with customer preferences and/or system performance requirements.

Operation of the Preferred Embodiment

As seen above, a system 100 is essentially a type of commerce system for peer-to-peer transactions of MP3 format music files. There are two major processes involved in its operation, as well as a number of secondary operational processes discussed further below. The first primary process involves introducing assets for sale or trade in to the system. This process is outlined in FIG. 2. The second primary process involves the actual purchase, trade and tracking of music files within the system. This process is outlined in FIG. 3.

Introducing Digital Assets

Figure 2:
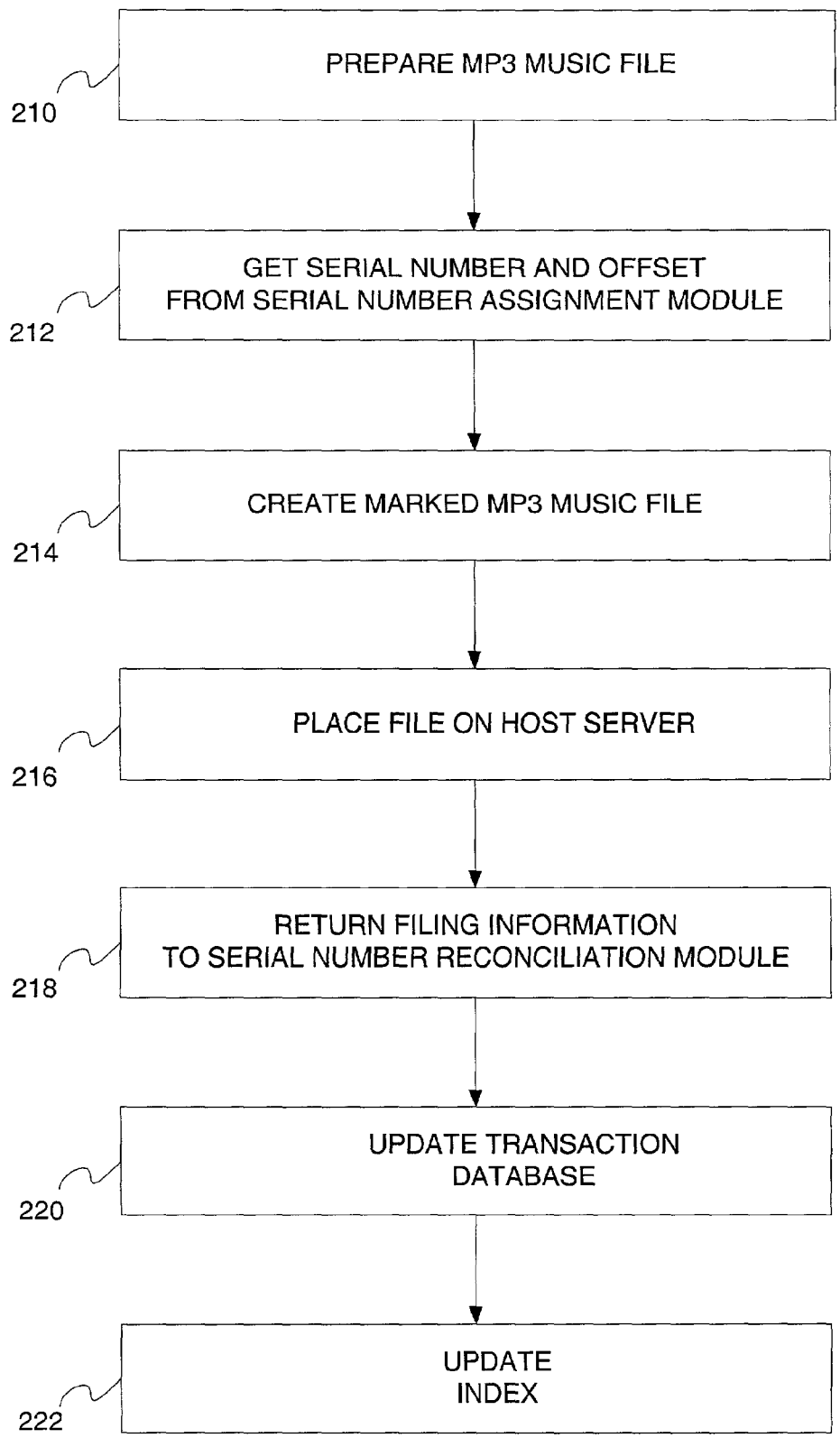
FIG. 2 is a flow chart showing the preferred steps involved to introduce a digital asset into a digital asset distribution/tracking system configured in accordance with the preferred embodiment of the present invention.

As illustrated in FIG. 2 the first step 210 to introducing a digital asset into an electronic network distribution system is for a Rights Holder (or other authorized party) to prepare or acquire an MP3 formatted music file (or some other digital content) for introduction into system 100. Such digital content may arrive from any number of different sources, and through various delivery mechanisms, including fixed media, standard wire based connections, wireless connections, etc. Moreover, while the preferred embodiment is beneficially used with an MP3 based file system, the present invention is not limited in this respect. Any number of well know types of electronic content can be put into suitable form for distribution within system 100.

In step 212 the Rights Holder runs a copy of the Rights Holder software 122 on Rights Holder Network Device 108 to provide a Serial Number Assignment Module 118 on System Network Device 106 with identifying information about themselves and indexing information for the content (file) to be introduced. Typically this information would include all the information that might be useful for indexing the asset within Index 114.

For Example:
  performer/artist
  producer/agent
  label
  writer/creator
  description
  title Terms of use information governing the transactions would also be included such as terms and expiration. Administrative information could also be included such as an Asset Identifier, a Rights Holder Identifier, and a copyright registration number or the like. The Rights Holder software would receive back an Asset Identifier, a Serial Number, and an Offset. Other types of information and variations on the above will be apparent to those skilled in the art from the present teachings. For instance, it may be useful to provide a pointer or URL with the content which specifies a network accessible database providing additional historical, biographical, and trivia data concerning the asset or its creators.

Furthermore, it may not be necessary in all cases for a Rights Holder to provide explicit information for each separate asset introduced. In other words, it is possible that Rights holders can specify a set of implicit distribution rules in advance, so that some distribution systems will only require a minimal set of final distribution rules before the asset can be introduced.

In step 214 an Asset Identifier is preferably placed in an obvious location within the MP3 music file itself—most preferably in the comments section of a tag portion of such file, or in an extended title field, or even pre-pended to such file. The Asset Identifier includes an Offset; the Offset specifies where to place a Serial Number in the MP3 file being marked, using steganographic techniques. A preferred approach is to use the Offset to specify a valid frame and word count within the MP3 file to begin the marking. The Serial Number is then encoded one bit at a time in the least significant bit of successive data words until the entire Serial Number is encoded. The frame CRC, if present, is also modified to reflect a new CRC for the frame.

It should be remembered that these are simply preferred approaches for the embodiment described herein, and that many other suitable variations are possible for any particular application. For instance, the Offset may not be needed in some cases because it can be set to some default value for a particular rights holder, or even randomly generated at the time of transfer. The Offset could also be encrypted, and/or be referenced with respect to some other identifying point within the file, such as an object contained therein. These are but examples of course, and the present invention is not limited to any particular implementation.

Furthermore, for some types of content, it may be possible to identify non-critical or blank data areas that are more appropriate for steganographically embedding the Serial Number. Other variations and modifications will be apparent to those skilled in the art.

In a preferred embodiment, the Offset and (at least initial) Serial Number are preferably provided by the System Network Device 108, but could be provided by Rights Holder Network Device 108 in some applications. Similarly, Asset Identifiers may be automatically generated without requiring specific input from a rights holder. In step 216 the marked file, representing a modified version of the original MP3 file, is placed on a Host Server 110 within system 100 as the initial (first) instantiation of a digital asset that now can be transferred and easily tracked. While shown as a separate device, Host Server 110 could be the Rights Holder Network device 108 itself, a third party service provider device, any customer device within the system, or any combination of such devices. Similarly, System Network Device 106 is shown as a separate system, but, again, in some applications could be integrated in some form as part of Rights Holder Network Device 108 and/or Host Server Network Device 110.

At step 218 Rights Holder module 122 interacts with and provides Serial Number Reconciliation Module 120 at System Network Device 106 with the locations on which the digital asset may be found, including at one or more separate network accessible Host Server Network Devices 110. The latter device may be connected to Network 102, and/or may provide other data paths for downloading files across some other transmission medium, such as a wireless network.

In step 220 Serial Number Reconciliation Module 120 then updates Transaction Database 116 with any information provided to Serial Number Assignment Module 118 during step 212.

In step 222 Serial Number Reconciliation Module 120 updates Index 114 with appropriate category listings, terms of use, and servers 110 on which the digital asset may be found for the digital content (MP3 music file) introduced.

At this point, therefore, the Rights Holder Network Device 108 has successfully completed any material steps for introducing a digital asset for distribution. As created, this digital asset can be downloaded by any number of peer devices 112 and subsequently tracked by a digital asset management system as transfers take place within system 100.

While not explicitly shown or described herein, the details of the various software routines, executable code, etc., required to effectuate the functionality discussed above are not material to the present invention, and may be implemented in any number of ways known to those skilled in the art.

Transfers of Digital Assets to/between Peer Devices

Figure 3:
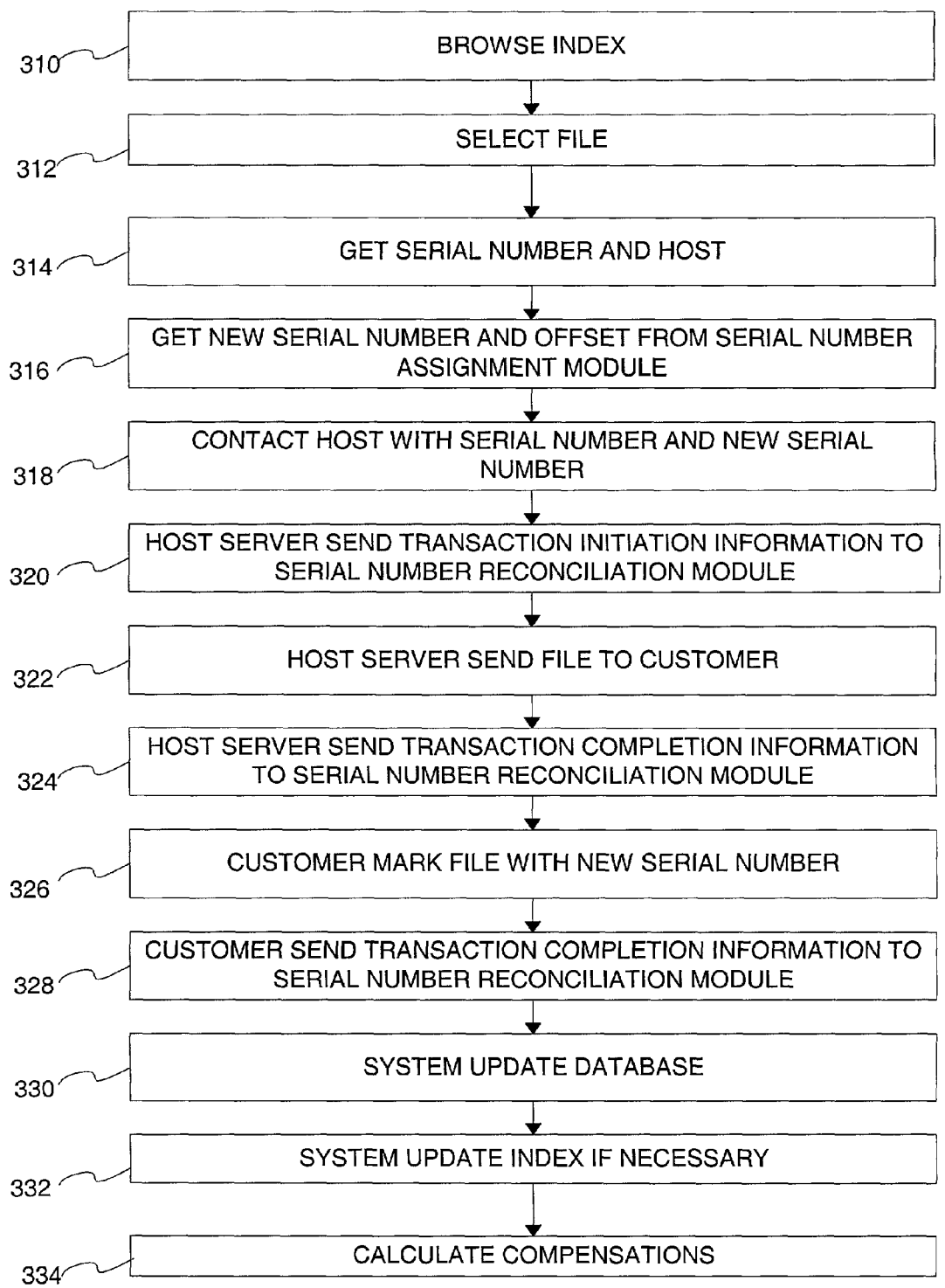
FIG. 3 is a flow chart showing the preferred steps involved to transfer a digital asset in a digital asset distribution/tracking system implementing the preferred embodiment of the present invention.

Much more common, of course, will be customer transactions as documented in FIG. 3. Beginning in step 310 a customer uses their copy of Client Server module 124 to browse an Index 114 resident on System Network Device 106. As alluded to earlier, the Customer Network Device 112 can connect to Network 102 in any number of different ways, including through land-based and wireless channels. To obtain access to System Network Device 106, a user first sets up an account in any conventional fashion, including with user identification information, user charge account information, and other similar data.

After reviewing Index 114, a user than makes a selection of a digital asset to acquire in step 312. This step also preferably includes a review and acknowledgement of at least some portions of the set of distribution rules associated with the selected digital asset, including the terms of use, before proceeding to further steps. Again, Index 114 is shown as being located at System Network Device 106, but it may be conveniently placed at other locations for perusal.

Based on indexing information for the selected digital asset, several host options may be presented to the customer and may include any location that is available to transfer the selected asset including Rights Holder Network Device 108, 3rd party hosters (such as Host Server 110), System Network Device 106, and/or other customer network devices 112. In another variation, to further enhance the usability of system 100, the user can also be presented with various additional options for download, so that, for example, a first connection to Network 102 might be used for browsing/selecting assets, while a separate connection (Internet, wireless, cable based, etc.) is used for downloading the actual assets. This would further allow data traffic to/from customers and download sites to be managed and divided intelligently according to cost, availability of bandwidth availability, etc. For instance a user could employ a hand held PDA device 112 having access to a narrowband channel for selecting a particular item, and then indicate that an actual download of the digital asset to a separate customer network device 112' be done using a relatively high speed broadband connection.

In step 314 Client Server module 124 gets the location of host and asset identifier information from Index 114 which correspond to a selected digital asset (MP3 music file) to be downloaded. Accordingly, at this point, a proposed data path is established for a new transaction involving a transfer between two separate computers coupled to network 102, of a particular instantiation of a digital asset, including in a peer to peer fashion between two client devices 112. For ease of use, the setup and transfer may be performed by either or both of such devices.

As noted earlier, a first instantiation of the digital asset is created based on an original offset and serial number embedded within the digital content. To allow for tracking of the particular transfer, a new instantiation of the digital asset is made. In step 316 Client Server module 124 gets a new serial number and new offset for this transaction from the Serial Number Assignment Module 118. The new serial number and new offset are used to create a unique instantiation of the digital asset for the particular transaction. Thus, instead of merely copying the digital content as part of the transfer, the present invention creates a separate instantiation to facilitate tracking of each transfer (or transaction) within system 100.

In some applications where security and accounting is not as critical (or can be remedied by other mechanisms consistent with the present teachings) it is possible that actual separate instantiations of the digital asset might not be required. Instead, it might be more practical to simply track the point-to-point movement of a digital asset across network between one or more Customer Network devices 112, and/or Host Server Network Device 110.

Serial Number Assignment Module 118 also preferably passes on such details as:
  serial number
  customer identifier
  asset identifier
  agreed to terms of use
  host identifier to Serial Number Reconciliation Module 120 which will keep these items until step 328 or a routine clean up should the transaction never complete.

In step 318 Client Server module 124 on Customer Network Device 112 contacts corresponding Client Server module 124 on Host Network Device 110 to begin the process of transferring the file. As mentioned earlier, it is not necessary that such actual file transfer occur over the same channel/session, or even the same network 102.

In step 320 Client Server module 124 at Host Server Network Device 110 sends tracking information to Serial Number Reconciliation Module 120 such as:
  customer identifier
  host identifier
  new serial number
  old serial number
  asset identifier The Serial Number Reconciliation Module records this tracking information along with a time stamp for further use during step 328. Again, it should be emphasized that these items for the tracking information are merely illustrative of the various kinds of useful information that can be maintained, and other examples will be apparent from the present teachings. It is expected, in fact, that the precise types of information to be maintained will vary significantly from application to application.

In step 322 Host Server Network Device 110 sends the selected digital asset to the customer using any desired standard file transfer method (including conventional internet file transfer techniques) which could include a mechanism for recovery/completion of the transaction if the transfer is incomplete.

At the completion of the transfer, Host Server Network Device initiates step 324 by contacting Serial Number Reconciliation Module 120 to report completion of the transfer or its abandonment and the reasons for such. This may be as simple as reporting just the new serial number but may also include information about the process of the transfer itself including number of transfer attempts, interruption information etc. Serial Number Reconciliation Module 120 the (optionally) adds a time stamp to the tracking information and saves it for step 328.

At step 326 Customer Client Server module 124 marks the digital asset file with the new serial number and offset preferably using the same steganographic technique described above in connection with FIG. 2, and then stores the digital asset in a form suitable for later retrieval and play on the user's system. Accordingly, at the end of the transfer, a second instantiation of the digital asset has been completed and stored for later transfer to yet another customer if desired.

Customer client server module 124 also contacts Serial Number Reconciliation Module 120 in step 328. It reports the transaction as being complete and also indicates whether and where the second instantiation of the digital asset can be found for transfer to other customers in system 100. Serial Number Reconciliation Module 120 time stamps this transaction.

In step 330 Serial Number Reconciliation Module 120 wraps up the transaction. An entry is made in Transaction Database 116 including such tracking information as:
  new serial number
  old serial number
  customer identifier
  host identifier
  terms agrees to by the customer
  asset identifier Of course, other databases may be updated including a customer database (not shown) that may indicate account status and a host database (not shown) that may indicate quality and volume of the transactions involving that particular host.

In step 332 Index 114 is updated to reflect whether the customer indicated that they are becoming a host for this digital asset.

As a final step 334 accounting tasks are performed by Accounting Module 126. This could include crediting the account of the Rights Holder according to the agreed upon transfer terms, crediting the account of the transaction host, and debiting the account of the customer that received the transaction. Other conventional accounting operations can also be performed in accordance with the needs and options desired for a particular implementation.

As with the digital asset introduction software modules, the various software routines, executable code, etc., required to effectuate the functionality discussed above are not material to the present invention, and may be implemented in any number of ways known to those skilled in the art.

OTHER FEATURES & VARIATIONS OF PRESENT INVENTION

Rogue Assets and Asset Monitoring

In another variation of the present invention, detection of "rogue" assets is performed prior to transfers. By this it is meant that a first customer may attempt to download a digital asset from a second customer, and in the process of doing so, System Network Device 106 may detect that there is no appropriate tracking record reflecting a prior authorized transfer to such second customer. Should a rogue asset be uncovered it can be analyzed to determine what asset it is (asset identifier, name, performer etc). At that point it can be searched for the embedded serial numbers that will lead to a complete transaction history for the asset when it was legitimately transferred. The last legitimate transaction can indicate where the asset escaped the system. To prevent further unauthorized transactions, appropriate countermeasures can be taken; for instance, the second customer's access privileges may be suspended or eliminated. At the very least, the source of the rogue asset would have to explain how it came in to their possession, and such actions are likely to inhibit further unauthorized disseminations of digital content. Furthermore, since a complete transaction histories are kept for each digital asset, it is not possible for users to simply extract proprietary content without being held accountable for their actions. In contrast, in existing distribution schemes, it is essentially impossible to determine the origin of unauthorized distributions. Furthermore, the present system is sufficiently flexible in that it may still allow a "rogue" asset transfer to be completed by simply converting it to an authorized digital asset with new tracking information. In this manner, the user's experience is not burdened by such monitorings, and in particular, the first user is not burdened with the task of determining the legitimacy of assets made available within system 100.

As a further enhancement to the system, proactive asset monitoring measures can also be taken. Possible repositories of assets can be searched and the assets checked for legitimacy following a similar approach to that outlined in the previous paragraph.

Distributed Index in Peer to Peer Implementations

As described above, system 100 has a centralized index 114 at System Network Device 106. In another variation, System 100 could also be implemented in a more true peer to peer fashion with Client Server module 124 including additional software that can catalog the MP3 music files it has local access to, as well as poll "nearby" Client Servers of other customers' network devices 112 for MP3 file attributes it is looking for, thus creating a form of distributed index 114.

Accounting Module Variations

Accounting Module 126 is also a centralized system that provides accounting functions for system 100. Some implementations could be coupled with a third party accounting system or a peer-to-peer accounting method. Furthermore, some implementations may not require an accounting module at all.

Similarly, in system implementations where centralized management is not desirable or possible, Client Server module 124 could pass along administration information with asset transfers while maintaining a local transaction database equivalent of centralized transaction database 116. An accounting of transfers and transactions could then be made on a periodic basis by having an accounting server check the local transaction databases of client network devices, or having such devices report their own records to such servers. This variation, therefore, uses a kind of electronic "meter checking" to monitor usage, downloads, etc.

Thus, as is evident from the above, a primarily peer-to-peer transaction system can be built that allows exchange of existing formats while tracking licensing, royalties, and providing rights management.

Serial Number Variations

The preferred embodiment uses Serial Numbers that are assigned centrally in a random unique way. Serial Numbers could also be generated either centrally or local to the transaction and guaranteed uniqueness by aggregating information unique to the transaction; for example: the host id, customer id, asset id, and time of transaction.

Asset Introduction Variations

Although in the preferred embodiment Rights Holders introduce their assets into system 100, this is not required to exploit the benefits of the inventions herein. So, system 100 will easily accommodate digital assets introduced by parties other than the Rights Holder, as long as there is some additional mechanism for identifying and attaching appropriate rights to such assets. This can be done through any number of conventional programming techniques known to those skilled in the art.

Customer Network Devices

As noted earlier, a Network device (including Customer Network Device 112, Rights Holder Network Device 108, System Network Device 106 and/or Host Server Network Device 110) need not be constantly connected to network 102 to be a part of system 100. In fact, in many cases, Customer Network Device 112 users do not stay connected at all times to their ISP. Transaction information and requests could be stored up on such devices for transmittal at an appropriate future time with the necessary resources. Thus, deferred or time-divided transfers are also easily effectuated within the parameters of the present inventions.

In another variation, a Network Device might work with multiple digital asset management systems 100 on the same or different networks 102. In other words, different markets or environments could be used to distribute different types of digital assets based on different distribution rules and in accordance with the present teachings.

In a further variation, a network device may be able to move digital assets singly or in bulk according to a set of distribution rules between different digital asset distribution/ tracking systems. For example, musical tastes tend to start in certain geographic areas and then migrate to others. The top 10 favorite music pieces from one geographic region for a particular demographic group could thus be automatically transferred on a regular basis as part of a "stocking" routine at Rights Holder Network Device 108 to ensure popular support for the system.

In some instances, a user of a network device 112 can also elect to perform hosting functions. In exchange for supporting such transfers, the user can be given some form of credit/ reimbursement/discounts from the digital asset management system for all authorized transfers made of digital assets. Ratings for various peer based hosts can also be maintained to increase the popularity and appeal of system 100.

In another application of the present invention, customer network device 112 may comprise a form of digital jukebox or kiosk located at a physical facility such as a restaurant, a bar (or similar entertainment establishment) or it could even be integrated as part of an airplane (transportation) seat entertainment system. The digital jukebox stores and presents content for selection to prospective customers in any number of conventional ways. For example, a conventional monitor, display, etc., can provide album, artist, song information visually to a user. Selection of a particular track can be made using any number of conventional mechanisms, including touch screens, keypads, buttons, etc. A conventional debiting system (coin or credit based) is used for collecting payment from the user. After verifying payment and selection, the digital jukebox preferably creates yet another instantiation of the digital asset chosen by the user, and such information is again tracked by system network device 106. In this fashion, a versatile, easily modified digital jukebox with access to a wide variety of content can be implemented in a variety of facilities. This application may be desirable where it is desired to minimize investment in fixed media (such as CDs, Records, tapes, etc.) which rapidly become obsolete due to changing tastes, and which require a fixed capital investment on the part of the proprietor.

Furthermore, client server 124 of the digital jukebox itself may include a centralized computer that is accessed by a number of distributed access nodes (not shown) at any particular facility. For instance in a casino, healthclub, or similar establishment a variety of fixed stations can be presented with trackable content (i.e., visually on a screen or audibly through a speaker, headphone or earphone) to a particular user to enhance his/her experience in a particular forum. This approach is also advantageous in mass transportation systems, such as airplanes, trains or cruise ships, and can be integrated within a personalized passenger seat entertainment system. Furthermore, from the perspective of digital rights holders, this approach may be attractive because the possibility of unauthorized accesses is greatly reduced in such controlled facilities.

To further augment the capabilities and attractiveness of this approach, a mechanism for providing music samples can be included as well, to increase likelihood and ease of use for the customer. For example, a small speaker, headphone or earphone is used as an output device, and in a fashion so as to not interfere or be disturbed by a main audio output provided by the digital jukebox. While such types of sampling are provided by some online sites (such as Amazon for example) the applicants are unaware of any such functionality provided at a physical facility in a digital jukebox.

In yet a further variation, the customer network device 112 can be implemented in the form of a digital vending machine, or a similar architecture suitable for hot-docking a phone, an MP3 player, or the like. For example, a number of conventional hand held devices now utilize memory stick technologies from a variety of vendors. By including some programming functionality in a digital vending machine, a user can select, store and/or play content on a portable personal digital appliance by modifying a modular memory device used by such appliance. Similarly, many hand held devices (including MP3 players) include standardized bus interfaces, including USB types, Firewire, etc. By including such bus on a digital vending machine, programming content on such hand held devices also becomes possible.

Digital Assets

Although the described preferred system 100 is optimized for transacting MP3 music files, as used herein, the term "digital asset" is intended in its broadest sense to encompass any number of different types of content, items (or electronic proxies for physical items) that can be distributed electronically. For instance, the present inventions could also be applied to other audio formats, video, pictures, interactive games, virtual experiences, programs, instruction sets, e-mail, webpages, advertisements, text (newspapers, books, op-ed pieces, articles and similar human readable media), etc. In other environments, digital assets could also be a form of electronic proxy and thus represent tangible goods such as merchandise to be delivered, merchandise redemption tickets, periodical products, etc. Similarly, Rights of use products can also be represented as digital assets such as event entry, time-share slots, pay per view, club membership, car rental, accommodation, travel, restaurant reservations, etc. Subscription products can also be represented as digital assets such as product of the month, magazine subscriptions, vacation clubs etc. Service products can also be represented such as car washes, haircuts, auto service, shipping, telephone service, house cleaning, etc. Financial products can also be represented as digital assets such as insurance, financial asset certificate, mortgages, loans, futures, income streams, digital cash, credit, dividends, etc. Commitments can also be represented as digital assets such as mortgages, loans, rent, short sales, subscriptions, etc. A variety of asset types could be managed by the same system simultaneously. Different products could also be combined in to a single digital asset.

Accordingly, the present inventions are expected to enable a wide variety of unique, useful and popular electronic market/distribution communities because the principles are easily extended to a wide variety of tradable items.

Steganographic Variations

While the preferred embodiment discussed above uses a steganographic technique for embedding a serial number in an MP3 file, there are many other approaches that could accomplish this same function. Furthermore, it is expected that the particular mechanism used to provide and associated serial numbers will be different from application to application, because various digital asset formats are receptive to different approaches.

In addition, as alluded to earlier, digital asset serial numbers could be prepended or postpended; alternatively, unused portions of the digital asset could be used to store the serial numbers. Finally, a modified format for a digital asset could be created to accommodate the serial number, such as new variation of an MP3 file, MPEG file, etc. For example, one or more standards groups or industry groups may utilize a form of digital asset that includes fields intended to accommodate a serial number.

Tracking Variations

The preferred embodiment embeds successive serial numbers in the media file in different unique locales for each instantiation of the digital asset, in a kind of passport-stamping approach This makes it harder to remove traces of the transaction history and easier to identify the transaction history, including all transfers occurring over the network, should the need arise. However in some cases the particular media for a digital asset may be better suited to storing only one or a limited number of serial numbers. In such cases the entire transaction history can be reconstructed by recovering a single serial number since each transaction references the serial number of the previous transfer, and database 116 maintains a record of each transfer.

The preferred embodiment describes the process of asset exchange by referring to the serial number as being linked in a one to one relationship with a transaction, and having a value based in some fashion on the characteristics of the transaction. Nonetheless, in another variation, it could just as easily be structured around the one to one relationship of the serial number and every instantiation of any asset, so that the serial number has a value based in some fashion on the characteristic of the digital asset.

Network Variations

System 100 described in the preferred embodiment makes use of a network 102 (preferably the internet) as well as a variety of network devices such as personal computers, and servers. System 100 could just as easily been described on any network 102 to which network devices and storage devices are attached. Possible devices include PDA's, cell phones, smart appliances to name a few. Possible networks include private network systems and future public network systems using cable, telephone, optical, wireless, fiber, and other pipe and broadcast technologies.

It can be seen quite clearly that the present inventions provide an additional measure of flexibility in managing digital assets within a particular distribution environment. It is no longer impossible to achieve the dual aims of both security for the rights holder, and ease of use for the end user. By permitting digital assets to be easily transacted in an open environment, and without cumbersome proprietary formats, the usability and attractiveness of a digital asset distribution network is considerably enhanced. The present invention achieves such goals by making the process easy for the various related entities and by operating in the background or in a transparent fashion that does not impede the utility and security of the overall system. In contrast to prior art systems which simply allow wholesale copying of digital assets without accountability, the present invention also addresses the needs and concerns of digital rights holders to ensure their participation and ultimate success of the system.

Although the present invention has been described in terms of a preferred embodiment, it will be apparent to those skilled in the art that many alterations and modifications may be made to such embodiments without departing from the teachings of the present invention. Other types of components beyond those illustrated in the foregoing detailed description can be used suitably with the present invention. Similarly, descriptions of many common components usable with the inventions and known to skilled artisans have been omitted so as to not obfuscate the present teachings. Accordingly, it is intended that the all such alterations, modifications and additions be included within the scope and spirit of the invention as defined by the following claims.

Finally, it should be noted that the Title and Abstract of the present disclosure have been provided solely to satisfy certain U.S. governmental administrative requirements, including the indexing requirements of 37 C.F.R. 1.72, and for no other purpose. As such, such portions of the present disclosure should not be relied upon for interpreting and/or limiting the scope of the present claims.

What is claimed is:

1. A system for exchanging digital assets over a network, comprising:
   (a) a first computer coupled to the network, said first computer storing a digital asset which includes both digital content and a first unique identifier associated with a first instantiation of said digital asset; and
   (b) said first computer being adapted to set up a customer account and an authorization to play said digital asset on a second computer coupled to the network; and
   (c) a first software routine executing on said first computer and/or said second computer, said first software routine being adapted to coordinate transfer of said digital asset to said second computer;
   wherein a second instantiation of said digital asset is created for said transfer to said second computer, said second instantiation including a second unique identifier including customer information associated with a customer for said digital asset;
   further wherein said digital asset has no copy protection and can be transferred from said second computer to a third computer by said customer without requiring an additional authorization from said first computer.

2. The system of claim 1, wherein said first computer and said second computer operate to transfer said digital asset in a peer to peer manner across the Internet.

3. The system of claim 1, wherein after said transfer, a second transfer of said digital asset can occur from either said first computer and/or said second computer, said second transfer further using a third instantiation of said digital asset and a third unique identifier.

4. The system of claim 1, wherein at least said second computer is a portable electronics device, including a personal computer, a personal digital assistant, and/or a telephone.

5. The system of claim 1, wherein said digital content includes an MP3 based audio file.

6. The system of claim 1, wherein said second unique identifier is based on combining information from any one or more of the following: a first id for said first computer, a second id for said second computer, an asset id for said digital asset, a customer id, a randomly generated number and/or a time of said transfer.

7. The system of claim 1, wherein a catalog of available digital assets is maintained at said first computer.

8. The system of claim 1, wherein said first software routine is also configured to execute an authorization routine, said authorization routine being adapted to secure agreement from a user of said second computer to access terms associated with said digital asset.

9. The system of claim 8, wherein said first routine is also configured to execute a setup routine, said setup routine being adapted to set up a transaction account with a digital asset management system separate from said first computer and said second computer, said transaction account including an identifier for a user of said second computer, identifiers for any transfers performed by said user, and billing information associated with said transfers.

10. The system of claim 8, wherein said first computer coordinates said transfer to said second computer in cooperation with a digital asset management system, such that said digital asset management system provides said second unique identifier.

11. The system of claim 10, wherein said first computer provides authorization for said digital asset management system to track all transfers of digital assets from said first computer.

12. The system of claim 11, wherein said first computer also performs hosting functions, and further receives credits from said digital asset management system for all authorized transfers made of digital assets.

13. The system of claim 8, wherein said second computer polls other computers coupled to the network to determine an optimal transfer source for said digital asset.

14. The system of claim 8, wherein said digital content includes content for a newspaper, a book, a magazine, and/or a periodical.

15. The system of claim 8, wherein said second instantiation of said digital asset is created in accordance with distribution rules in place at the time of said transfer, which distribution rules can be different from distribution rules in place at the time of creation of said first instantiation of said digital asset.

16. The system of claim 8, wherein said second computer is integrated within a fixed personal entertainment system, including a gambling machine, a digital jukebox, and/or a passenger seat.

17. A method of exchanging digital assets over a network, comprising the steps of:
(a) storing a digital asset on a first computer coupled to the network, which digital asset includes both digital content and a first unique identifier associated with a first instantiation of said digital asset; and
(b) setting up a customer account with said first computer including an authorization to play said digital asset on a second computer coupled to said first computer over the network; and
(c) creating a second instantiation of said digital asset, including a second unique identifier;
wherein said second unique identifier includes customer information associated with a customer for said digital asset;
(d) storing said second instantiation of said digital asset at said second computer;
wherein said digital asset has no copy protection and can be transferred from said second computer to a third computer by said customer without requiring an additional authorization from said first computer.

18. The method of claim 17, further including a step: storing said second unique identifier as part of said digital asset.

19. The method of claim 17, further including a step transferring said digital asset between said first computer and said second computer in a peer to peer manner across the Internet.

20. The method of claim 17, further including a step: performing a second transfer of said digital asset from either said first computer and/or said second computer, said second transfer further using a third instantiation of said digital asset and a third unique identifier.

21. The method of claim 17, wherein at least said second computer is a portable electronics device, including a personal computer, a personal digital assistant, and/or a telephone.

22. The method of claim 17, wherein said digital content includes an audio file.

23. The method of claim 17, wherein said second unique identifier is based on combining information from any one or more of the following: a first id for said first computer, a second id for said second computer, an asset id for said digital asset, a customer id, a randomly generated number and/or a time of said transfer.

24. The method of claim 17, wherein a catalog of available digital assets is maintained at said first computer.

25. The method of claim 17, wherein said first software routine is also configured to execute an authorization routine, said authorization routine being adapted to secure agreement from a user of said second computer to access terms associated with said digital asset.

26. The method of claim 17, wherein said first routine is also configured to execute a setup routine, said setup routine being adapted to set up a transaction account with a digital asset management system separate from said first computer and said second computer, said transaction account including an identifier for a user of said second computer, identifiers for any transfers performed by said user, and billing information associated with said transfers.

27. The method of claim 17, wherein said first computer coordinates said transfer to said second computer in cooperation with a digital asset management system, such that said digital asset management system provides said second unique identifier.

28. The method of claim 27, wherein said first computer provides authorization for said digital asset management system to track all transfers of digital assets from said first computer.

29. The method of claim 27, wherein said first computer also performs hosting functions, and further receives credits from said digital asset management system for all authorized transfers made of digital assets.

30. The method of claim 17, wherein said second computer polls other computers coupled to the network to determine an optimal transfer source for said digital asset.

31. The method of claim 17, wherein said digital content includes content for a newspaper, a book, a magazine, and/or a periodical.

32. The method of claim 17, wherein said second instantiation of said digital asset is created in accordance with distribution rules in place at the time of said transfer, which distribution rules can be different from distribution rules in place at the time of creation of said first instantiation of said digital asset.

33. The method of claim 17, wherein said second computer is integrated within a fixed personal entertainment system, including a gambling machine, a digital jukebox, and/or a passenger seat.

34. A method of exchanging digital assets over a network, comprising the steps of:
  (a) providing a first computing system coupled to the network;
  (b) storing a digital asset in one or more storage systems accessible to said first computing system, which digital asset includes both digital content and a first unique identifier associated with a first instantiation of said digital asset; and
  (c) providing a second computing system which is coupled to the network and implements a digital asset management system which stores transaction information concerning said digital asset;
  (d) selectively coupling said first computing system to a third computing system in response to a request made for said digital asset by a routine executing on behalf of said third computing system; and
  (e) processing said request at said second computing system to generate an authorization for a transfer of said digital content of said digital asset;
  (f) determining which one or more of said one or more storage systems should be used to transfer said digital content for said digital asset;
  (g) creating a second instantiation of said digital asset for said request, including a second unique identifier; wherein said second unique identifier includes customer information associated with a customer for said digital asset;
  (h) transferring said second instantiation of said digital asset, including said second unique identifier, to said third computing system from one or more of said one or more storage systems based on said authorization;
  updating said transaction information at said second computing system based on said transfer;
  wherein each transfer of said digital asset between different computing systems is associated with a unique identifier embedded within the digital asset to facilitate tracking across the network, such that different versions of the digital asset are created for said transfers, and each version carries a complete transaction record of transfers of prior versions.

35. The method of claim 34, wherein said authorization includes a right to host said digital asset at said third computing system.

36. The method of claim 34 further including a step: crediting a rights holder account based on said transfer of said digital asset.

37. The method of claim 34 further including a step: debiting a customer account based on said transfer of said digital asset.

38. The method of claim 34, further including a step: determining whether one or more of said storage systems is storing an unauthorized version of said digital asset.

39. The method of claim 38, further including a step: determining a source of a prior transfer of said unauthorized version of said digital asset.

40. The method of claim 1 further including a step: recording a time stamp associated with each transfer of said digital asset across the network.

41. The method of claim 1 wherein said digital asset includes an associated advertisement.

42. The method of claim 1: further including a step: converting a second digital asset on said second computer to a second instantiation of said second digital asset including a third unique identifier including customer information associated with a customer for said second digital asset; further wherein said second digital asset has no copy protection and can be transferred from said second computer to a third computer by said customer without requiring an additional authorization from said first computer.

* * * * *